(12) United States Patent
Hawkins

(10) Patent No.: US 8,347,428 B2
(45) Date of Patent: Jan. 8, 2013

(54) PORTABLE BATHROOM AND KITCHEN FIXTURE DISPLAY

(75) Inventor: David L. Hawkins, Akron, OH (US)

(73) Assignee: David L. Hawkins, Akron, OH (US)

( * ) Notice: Subject to any disclaimer, the term of this patent is extended or adjusted under 35 U.S.C. 154(b) by 850 days.

(21) Appl. No.: 12/469,991

(22) Filed: May 21, 2009

(65) Prior Publication Data

US 2010/0297598 A1 Nov. 25, 2010

(51) Int. Cl.
*A47K 4/00* (2006.01)
*E03C 1/01* (2006.01)

(52) U.S. Cl. .................... 4/663; 4/321; 434/80

(58) Field of Classification Search .............. 4/663, 321, 4/323, 458, 673; 434/80, 382
See application file for complete search history.

(56) References Cited

U.S. PATENT DOCUMENTS

| 3,183,525 | A | * | 5/1965 | O'Brien et al. | 4/663 |
| 4,868,936 | A | * | 9/1989 | Crocoli | 4/663 |
| 4,899,402 | A | * | 2/1990 | Maynard et al. | 4/663 |

* cited by examiner

*Primary Examiner* — Tuan N Nguyen
(74) *Attorney, Agent, or Firm* — Hahn Loeser & Parks, LLP

(57) ABSTRACT

A portable bathroom and kitchen fixture display includes a base, walls rising from the top of the base, a canopy spanning the walls, a holding tank within the base, fluid supply and fluid drain conduits, a plurality of fixtures selectively mounted to the base, and a fluid pump within the holding tank.

16 Claims, 3 Drawing Sheets

PORTABLE BATHROOM AND KITCHEN FIXTURE DISPLAY

TECHNICAL FIELD

The subject invention relates to a portable display, and more particularly, to a portable display for bathroom and kitchen fixtures.

BACKGROUND OF THE INVENTION

Prior to constructing a new home or remodeling an existing home, consumers and designers frequently desire to observe kitchen and bathroom fixtures in a functional display in order to aid in their selection. Such a display may appear in a design showroom or a tradeshow, where a consumer is able to turn on a bath tub, shower, sink or bidet, or flush a toilet to observe the fixture in its functioning state. In addition to aiding consumers, such displays may permit fixture manufacturers to display an entire suite of fixtures designed to have a similar appearance in a single setting so that a consumer may observe the entire suit together. For example, a fixture suite may include a toilet (water closet), a bidet, a bath tub or a shower, and a lavatory (sink).

To accommodate changes in consumer taste and market demand, fixture manufacturers must develop new fixture designs. Prior art fixture displays do not presently allow a manufacturer to replace older design or outdated fixtures with new fixtures without performing extensive plumbing or remodeling of existing displays.

Prior art functional bathroom and kitchen fixture displays typically include a single fixture, for example a toilet or a sink, mounted on top of a reservoir for containing water that is passed through the fixture during demonstrations. One problem with these displays is that the supply of water is continually recycled through the display, from the fixture, to the reservoir, and back through the fixture during a multitude of cycles. As the water is continually cycled through the display, it may become contaminated by soil and other contaminants as individuals interacting with the display place their hands in the water. This dirty water diminishes the attractiveness of the display and cause consumers to associate the fixture manufacturer with the dirty water/dirty display, thereby decreasing the likelihood that the consumer will purchase that manufacturer's fixture.

An additional problem in prior art functional displays is that as the water becomes contaminated, these water-recycling displays have no efficient means of disposing of the contaminated water and replacing the water with clean, fresh water. Typically, this means that a display must use the contaminated water for the duration of the display period, until the display can be moved to a location (if the display is even portable) where the water can be siphoned or poured from the reservoir into a suitable water disposal location, which may include a floor drain. In many instances, however, design showrooms or trade shows do not contain easily accessible floor drains, and the cost to install such a drain after a showroom has been completed is frequently prohibitive of such an installation.

Therefore, there is a need in the art for a portable bathroom and kitchen fixture display which permits a continuous supply of clean water to the displayed fixtures, which permits drainage of the display in response to the supply of the water to the display. Also needed is a display which permits display of an entire suite of fixtures, while affording a manufacturer the ability to replace older model fixtures with updated, newer model fixtures.

SUMMARY OF THE INVENTION

To overcome the disadvantages of the prior art, disclosed in one embodiment is a portable bathroom and kitchen fixture display comprising a base box having a top, a bottom, and a perimeter wall connecting the top and the bottom, a first wall and a second wall rising vertically from the top of the base box, a canopy extending horizontally from the top of the first wall to the top of the second wall, a fluid supply conduit located within the base box, a fluid drain conduit located within the base box, a holding tank disposed within the base box, a plurality of fixtures selectively mounted to top of the base box, wherein the plurality of fixtures is in fluid communication with the fluid supply conduit and the holding tank, and a fluid pump in fluid communication with the fluid drain conduit and at least partially disposed in the holding tank, wherein the fluid pump includes a backflow prevention device and a fluid level sensor.

In another embodiment, a portable bathroom and kitchen fixture display comprises a base box having a top, a bottom, and a perimeter wall connecting the top and the bottom, a fluid supply conduit and a fluid drain conduit located within the base box, a holding tank disposed within the platform, at least one fixture selectively mounted to top of the box, wherein the at least one fixture is in fluid communication with the fluid supply conduit and the holding tank, and a fluid pump in fluid communication with the fluid drain conduit and partially disposed in the holding tank, wherein the fluid pump includes a backflow prevention device and a fluid level sensor.

In still another embodiment, a portable bathroom and kitchen fixture display comprises a base box having at least a first wall and wall rising vertically from the top of the base box, a fluid supply conduit located within the at least first wall, a fluid drain conduit located within the at least first wall, a holding tank disposed within the base box, at least one fixture selectively mounted to top of the base box, wherein the at least one fixture is in fluid communication with the fluid supply conduit and the holding tank, a fluid pump in fluid communication with the fluid drain conduit and partially disposed in the holding tank, wherein the fluid pump includes a backflow prevention device and a fluid level sensor, and a second fluid level sensor disposed in the holding tank at a height higher than the height of the pump fluid level sensor, wherein the second fluid level sensor activates the pump when a fluid level in the holding tank rises to the height of the second fluid level sensor.

DETAILED DESCRIPTION

Figure 1:
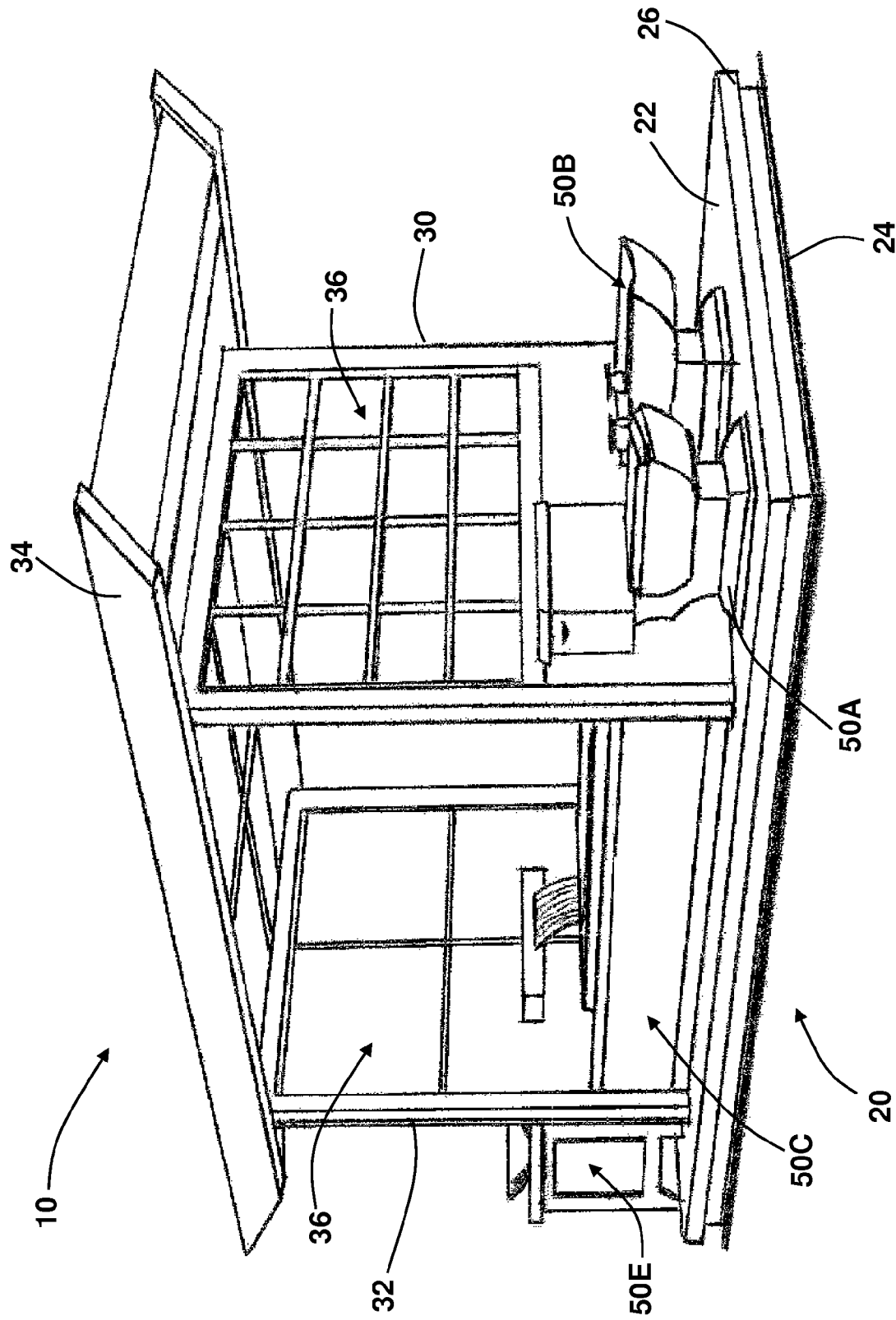
FIG. 1 shows a perspective view of a portable, functional display.

Referring now to FIG. 1, one embodiment of a portable bathroom and kitchen fixture display 10 is shown. The display 10 includes base box 20, having top 22, bottom 24, and perimeter wall 26 connecting top 22 and bottom 24. It is envisioned that perimeter wall 26 may include more than one wall, where each wall has a different perimeter from the other wall. In additional display 10 includes a first wall 30 and a second wall 32 rising vertically from top of base box 22, and canopy 34 extending horizontally from the top of first wall 30 to second wall 32. In one embodiment, walls 30, 32 may built to accommodate decorative panels 36. Decorative panels 36 may be square in shape, although it is contemplated that the panels 36 may be one or more shapes and/or one or more sized, depending upon the desired design of the panel section of walls 30, 32. It is also envisioned that it may be desirable to remove the panels 36 from the walls altogether such that walls 30, 32 may contain a void.

In construction, it is envisioned that base box 20, first wall 30, second wall 32, and canopy 34 may be formed from wood, medium density fiber board, metal, or other materials suitable for construction of such a display.

Figure 2:
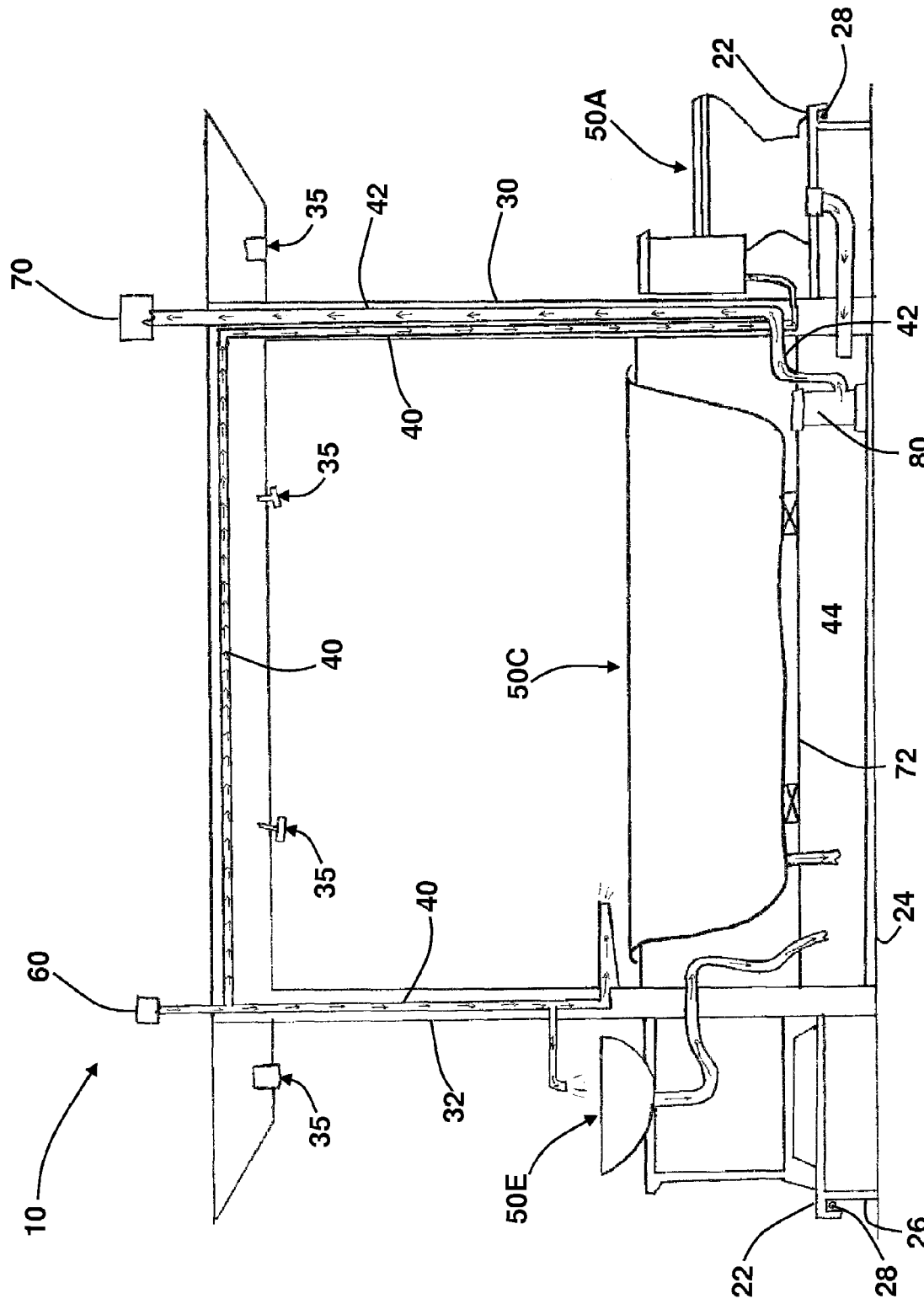
FIG. 2 shows a cross-sectional side view of the display of FIG. 1.

In one embodiment, shown in FIG. 2, it is contemplated that a light source 28 may be mounted about the perimeter wall 26 of base box 20. Light source 28 may be provided as a safety feature, as there may be a difference in height between base box 20 and the surface upon which it rests. It is envisioned that light source 28 may be sufficiently bright so as to indicate that there is a change in height between base box 20 and its supporting surface. In addition or in the alternative, at least another light source 35 may be mounted within canopy 34 and/or to the bottom surface of canopy 34. Light source 35 may be, for example, track lighting to provide general ambient lighting to the display, or recessed down lights designed to spotlight individual aspects of display 10. It is also envisioned that track lighting and recessed down lights may be used in combination to illuminate display 10.

Still referring to FIG. 2, display 10 may include fluid supply conduit 40, fluid drain conduit 42, and holding tank 44, which is disposed within base box 20. In one embodiment, fluid supply conduit 40 is located within first wall 30, canopy 34, second wall 32, and base box 20. It is also envisioned that supply conduit 40 is disposed solely within base box 20, or within any combination of walls 30, 32, canopy 34, and base box 20, depending upon the fluid supply needs of display 10. Fluid drain conduit 42 may be located solely within base box 20, within base box 20 and in addition second wall 32, although it is also envisioned that fluid drain conduit 42 may be located within any combination of walls 30, 32, canopy 34, and base box 20, depending upon the fluid draining needs of display 10. In construction, fluid supply conduit 40 and fluid drain conduit 42 may be formed from copper tubing, polyvinyl chloride tubing, or other materials known in the plumbing arts.

Display 10 may further comprise at least one bathroom or kitchen fixture 50. In one embodiment, the at least one plumbing fixture 50 may be a plurality of plumbing fixtures. For example, the fixture may be a water closet or toilet, a bidet, a bath tub and/or a shower, a lavatory, or a sink. The fixture 50 may be designed to receive fluid from a fluid supply and drain the received fluid through the fixture to a drainage location.

As shown in the FIGS., a plurality of fixtures 50 may be selectively mounted to the top of base box 22. As such, the plurality of fixtures 50 may be mounted to display 10 depending upon the desires of the user. In one instance, the plurality of fixtures may be selected from the group of fixtures including a water closet or toilet 50A, a bidet 50B, a bath tub 50C and/or a shower 50D, a lavatory 50E, or a sink 50F. More specifically, the plurality of fixtures 50 may be a water closet 50A, a bidet 50B, a bath tub 50C, and a lavatory 50E. Still more specifically, the plurality of fixtures 50 may be a water closet, a bidet, a bath tub, and a lavatory selected from the same suite of fixtures manufactured by a single fixture designer. For the purposes of this disclosure, a suite is defined as a group of fixtures that are designed to have the same design features and appearance.

In one alternative, a manufacturer may utilize display 10 to display the appearance of a fixture suite with a bathroom. In another alternative, a fixture manufacturer selectively mount the fixtures 50 such that the plurality includes a water closet from each suite, so as to demonstrate the entirety of the manufacturer's water closet offerings. In still another alternative, a retailer may choose to selectively mount water closets from a variety to display the function of each water closet available for purchase from the retailer. As can be seen, the plurality of fixtures 50 may include a multiplicity of combinations of fixtures, depending upon the intent of the entity utilizing display 10.

Returning now to FIG. 2, fluid supply conduit 40 may be selectively attachable to a fluid supply source 60. It is envisioned that the fluid supply source 60 may be a municipal water supply, a pressured water tank, or a gravity fed water tank, although other fluids and sources of fluids may be similarly supplied to and used within display 10. The selective attachability of supply conduit 40 permits display 10 to be moved to a variety of locations within a show room or tradeshow, depending upon the availability of a fluid supply source. Therefore, a show room or trade show need not expend the time and expense to install a complete plumbing system in order to supply fluid to display 10.

As the plurality of fixtures 50 may be in fluid communication with fluid supply conduit 40, fixtures 50 may be supplied with fluid after fluid supply conduit 40 is attached to fluid supply source 60. For example, once fluid has been supplied to fixtures 50, a toilet may be flushed or a bath tub filled with water to demonstrate how each fixture 50 operates. Similarly, the fixtures 50 may be in fluid communication with holding tank 44, so that fluid flowing through the fixtures 50 flows into holding tank 44.

As shown in FIG. 2, pump 80 may be at least partially disposed within holding tank 44 Pump 80 may be in fluid communication with fluid drain conduit 42, which in turn is selectively attachable to drain 70. Pump 80 may contain a fluid level sensor so that as the fluid level rises within holding tank 44, fluid level sensor sends a signal which activates pump 80, thereby pumping fluid from holding tank 44 through fluid drain conduit 42 to drain 70. To ensure fluid pumped into fluid drain conduit 42 does not flow through pump 80 back into holding tank 44, pump 80 may be provided with a backflow prevention device, which may include without limitation an air gap, an atmospheric vacuum breaker, a check valve, a double check valve, a pressure vacuum breaker assembly, or a reduced pressure assembly. Additionally, it is envisioned that a second fluid level sensor may be disposed within the holding tank 44 at a position higher than the pump fluid level sensor. In instances where the pump level sensor fails, it is envisioned that the second fluid level sensor may activate the pump when the fluid level in the holding tank rises to the height of the second fluid level sensor, thereby preventing the holding tank from overflowing.

Drain 70 may be a floor drain, a ceiling or roof drain located a position vertically higher than display 10, or any other drain into which fluids which have passed through display 10 may be pumped. Display 10 may be positioned at any location within a show room, tradeshow, or the like, where it is possible to selectively attach fluid drain conduit 42 to a drain. This portability of display 10 permits retailers and manufacturers of bathroom and kitchen fixtures to display their fixtures in a functioning manner without the need to design for or to install expensive drains at desired display locations. In one alternative, the drain may be in fluid communication with a municipal water treatment facility. In another alternative, a retail store may utilize a garden hose as a drain and use the water (or other fluid) pumped from display 10 to water the landscaping outside of the show room.

Figure 3:
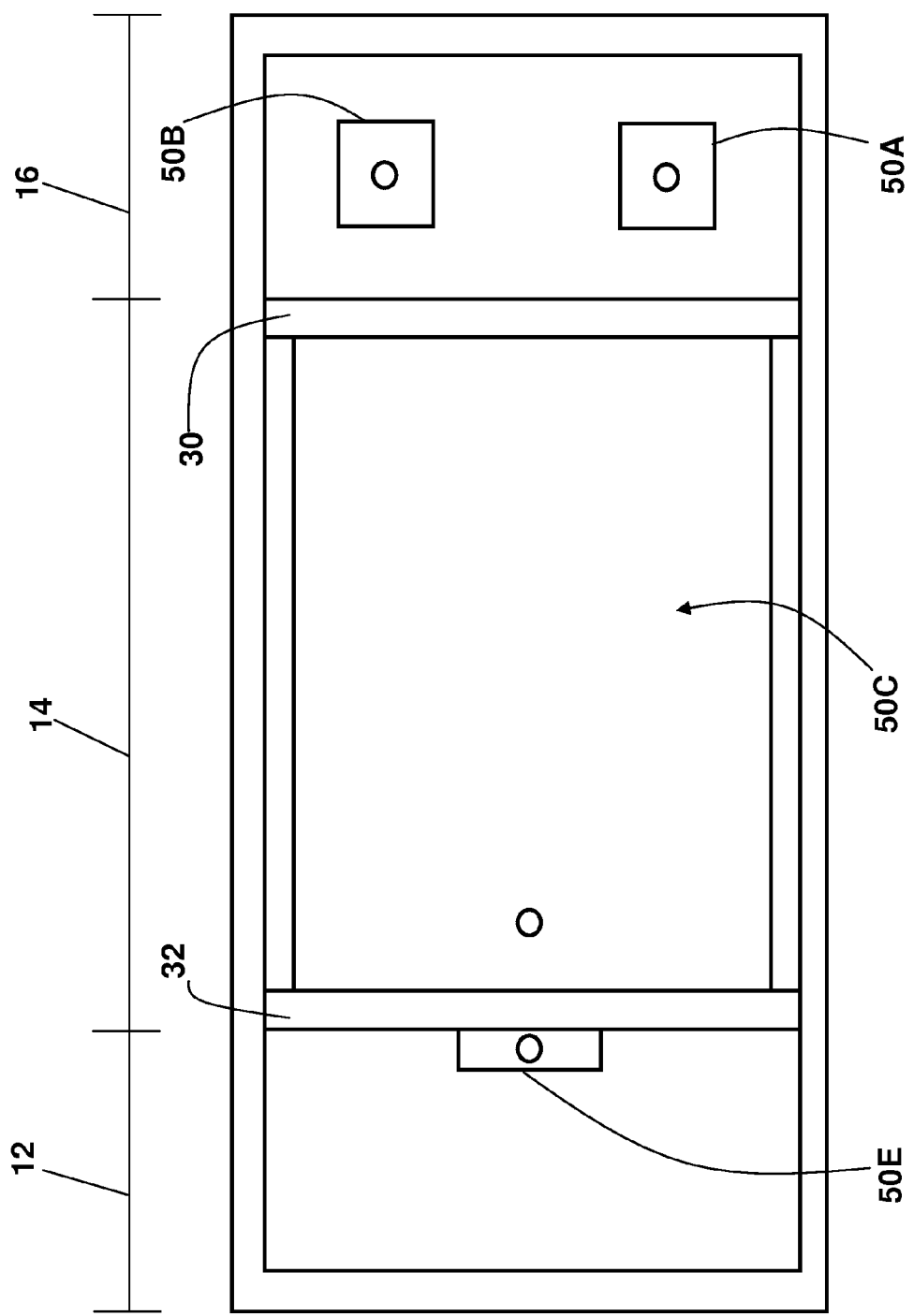
FIG. 3 shows a plan view of the base box of the display of FIG. 1 with canopy removed for clarity.

Now turning to FIG. 3, first wall 30 and second wall 32 may be used to divide the top of base box 20 into a first region 12, a second region 13, and a third region 14. In one instance, a lavatory 50E may be selectively attached to the first region 12, a bath tub 50C may be selectively attached to the second region 13, and a water closet 50A and a bidet 50B may be attached to the third region 14. In an alternate embodiment (not shown), it is envisioned that a first wall may rise vertically upward from the top of base box, therein dividing the base box into a first and second region.

The foregoing description of the preferred embodiments of the disclosure is by way of example only, and other variations of the above described embodiments are provided by the subject invention. The embodiments presented herein have been presented for purposes of illustration and are not intended to be exhaustive or limiting. Many variations and modifications are possible in light of the foregoing teaching.

What is claimed is:

1. A portable bathroom and kitchen fixture display comprising:
    a base box having a top, a bottom, and a perimeter wall connecting the top and the bottom;
    a first wall and a second wall rising vertically from the top of the base box;
    a canopy extending horizontally from the top of the first wall to the top of the second wall;
    a fluid supply conduit located within the base box;
    a fluid drain conduit located within the base box;
    a holding tank disposed within the base box;
    a plurality of fixtures selectively mounted to top of the base box, wherein the plurality of fixtures is in fluid communication with the fluid supply conduit and the holding tank; and
    a fluid pump in fluid communication with the fluid drain conduit and at least partially disposed in the holding tank, wherein the fluid pump includes a backflow prevention device and a fluid level sensor.

2. The display of claim 1, wherein the fluid supply conduit is in addition located within the first wall, the canopy, and the second wall and wherein the fluid drain conduit is in addition located within the second wall.

3. The display of claim 2, wherein the fluid supply conduit is selectively attachable to a fluid supply source.

4. The display of claim 3, wherein the fluid supply source is a municipal water supply.

5. The display of claim 3, wherein the fluid supply source is a pressurized water tank.

6. The display of claim 2, wherein the fluid drain conduit is selectively attachable to a drain.

7. The display of claim 6, wherein the drain is in fluid communication with a municipal water treatment facility.

8. The display of claim 6, wherein the drain is located at a position vertically higher than the display.

9. The display of claim 2, wherein the plurality of fixtures is selected from the group consisting of a water closet, a bidet, a bath tub, a shower, and a lavatory.

10. The display of claim 9, wherein the plurality of fixtures is a water closet, a bidet, a bath tub, and a lavatory.

11. The display of claim 10, wherein the first wall and the second wall divide the top of the base box into a first region, a second region, and a third region.

12. The display of claim 11, wherein the lavatory is selectively attached to the first region of the base box, the bath tub is selectively attached to the second region of the base box, and the water closet and the bidet are selectively attached to the third region of the base box.

13. The display of claim 10, wherein the lavatory, the bath tub, the water closet, and the bidet are manufactured by a single manufacturer of fixtures.

14. The display of claim 2, wherein at least one light source is mounted about perimeter wall of the base box and at least another light source is mounted to the bottom of the canopy.

15. The display of claim 2, wherein the first wall and the second wall include a plurality of selectively removable panels.

16. The display of claim 2, further comprising a second fluid level sensor disposed in the holding tank at a height higher than the height of the pump, wherein the second fluid level sensor activates the pump when the fluid level in the holding tank rises to the height of the second fluid level sensor.

* * * * *